(12) United States Patent
Hyun

(10) Patent No.: US 10,762,798 B2
(45) Date of Patent: Sep. 1, 2020

(54) AUTONOMOUS DRIVING METHOD AND APPARATUS

(71) Applicant: Samsung Electronics Co., Ltd., Suwon-si (KR)

(72) Inventor: Yoonsuk Hyun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 463 days.

(21) Appl. No.: 15/493,398

(22) Filed: Apr. 21, 2017

(65) Prior Publication Data

US 2018/0061253 A1 Mar. 1, 2018

(30) Foreign Application Priority Data

Sep. 1, 2016 (KR) .................. 10-2016-0112446

(51) Int. Cl.
*G08G 7/02* (2006.01)
*B60W 30/095* (2012.01)
(Continued)

(52) U.S. Cl.
CPC ........... *G08G 7/02* (2013.01); *B60W 30/0956* (2013.01); *B60W 30/12* (2013.01); *B60W 30/16* (2013.01); *B60W 50/0097* (2013.01); *G05D 1/0088* (2013.01); *G05D 1/0214* (2013.01); *G05D 1/0223* (2013.01); *G05D 1/0246* (2013.01); *G05D 1/101* (2013.01); *G06N 3/08* (2013.01); *G08G 1/015* (2013.01); *G08G 1/0175* (2013.01); *G08G 1/163* (2013.01); *G08G 1/164* (2013.01); *G08G 1/166* (2013.01); *G08G 1/167* (2013.01); *B60W 2300/12* (2013.01); *B60W 2300/34* (2013.01); *B60W 2300/36* (2013.01); (Continued)

(58) Field of Classification Search
CPC .......... G08G 7/02; G08G 1/166; G08G 1/164; G08G 1/163; G08G 1/0175; G08G 1/015; G08G 1/167; G05D 1/0246; G05D 1/0223; G05D 1/101; G05D 1/0088; G05D 1/0214; G05D 2201/0213; B60W 50/0097; B60W 30/0956; B60W 2550/406; B60W 2300/12; B60W 2300/34; B60W 2300/36; B60W 2420/42; B60W 2420/52; B60W 2750/30; B60W 2754/10; B60W 30/12; B60W 30/16; B60W 60/0015; G06N 3/08; G06K 9/00845; G06Q 40/08; G06Q 10/0635
See application file for complete search history.

(56) References Cited

U.S. PATENT DOCUMENTS

2005/0267608 A1* 12/2005 Nishira .............. B60K 31/0008
700/44
2014/0358840 A1* 12/2014 Tadic .................... B60W 40/09
706/52
(Continued)

FOREIGN PATENT DOCUMENTS

| JP | 2014-8931 A | 1/2014 |
|---|---|---|
| KR | 10-2012-0067762 A | 6/2012 |
| KR | 10-1610544 B1 | 4/2016 |

*Primary Examiner* — Nga X Nguyen
(74) *Attorney, Agent, or Firm* — Sughrue Mion, PLLC

(57) ABSTRACT

An autonomous driving method includes: determining a risk of a target vehicle based on either one or both of a driving characteristic and an appearance characteristic of the target vehicle; and autonomously controlling a host vehicle based on the risk.

23 Claims, 13 Drawing Sheets

(51) Int. Cl.

| | |
|---|---|
| *B60W 50/00* | (2006.01) |
| *G05D 1/00* | (2006.01) |
| *G05D 1/02* | (2020.01) |
| *G05D 1/10* | (2006.01) |
| *G06N 3/08* | (2006.01) |
| *G08G 1/16* | (2006.01) |
| *B60W 30/12* | (2020.01) |
| *B60W 30/16* | (2020.01) |
| *G08G 1/017* | (2006.01) |
| *G08G 1/015* | (2006.01) |

(52) U.S. Cl.
CPC ..... *B60W 2420/42* (2013.01); *B60W 2420/52* (2013.01); *B60W 2554/804* (2020.02); *B60W 2556/60* (2020.02); *B60W 2754/10* (2020.02); *G05D 2201/0213* (2013.01)

(56) References Cited

U.S. PATENT DOCUMENTS

| | | | |
|---|---|---|---|
| 2015/0149088 A1* | 5/2015 | Attard | G01C 21/36 |
| | | | 701/538 |
| 2016/0125746 A1 | 5/2016 | Kunzi et al. | |
| 2016/0362118 A1* | 12/2016 | Mollicone | B60W 40/09 |
| 2017/0057497 A1* | 3/2017 | Laur | B60W 30/0953 |
| 2017/0327110 A1* | 11/2017 | Inoue | B60W 10/18 |

\* cited by examiner

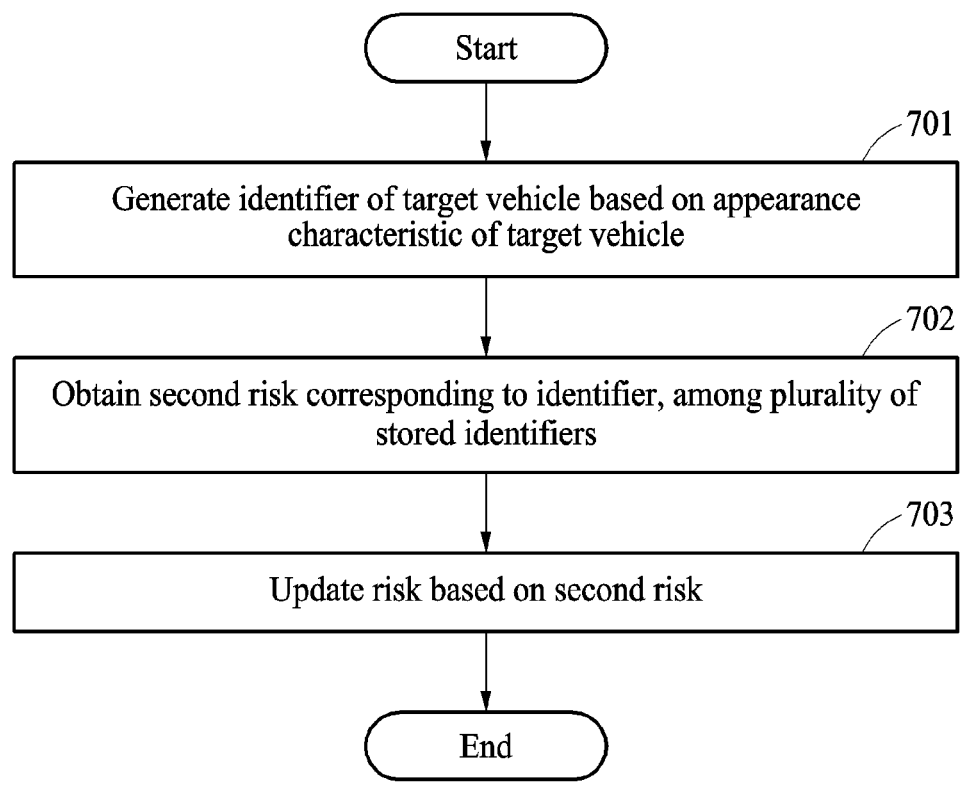

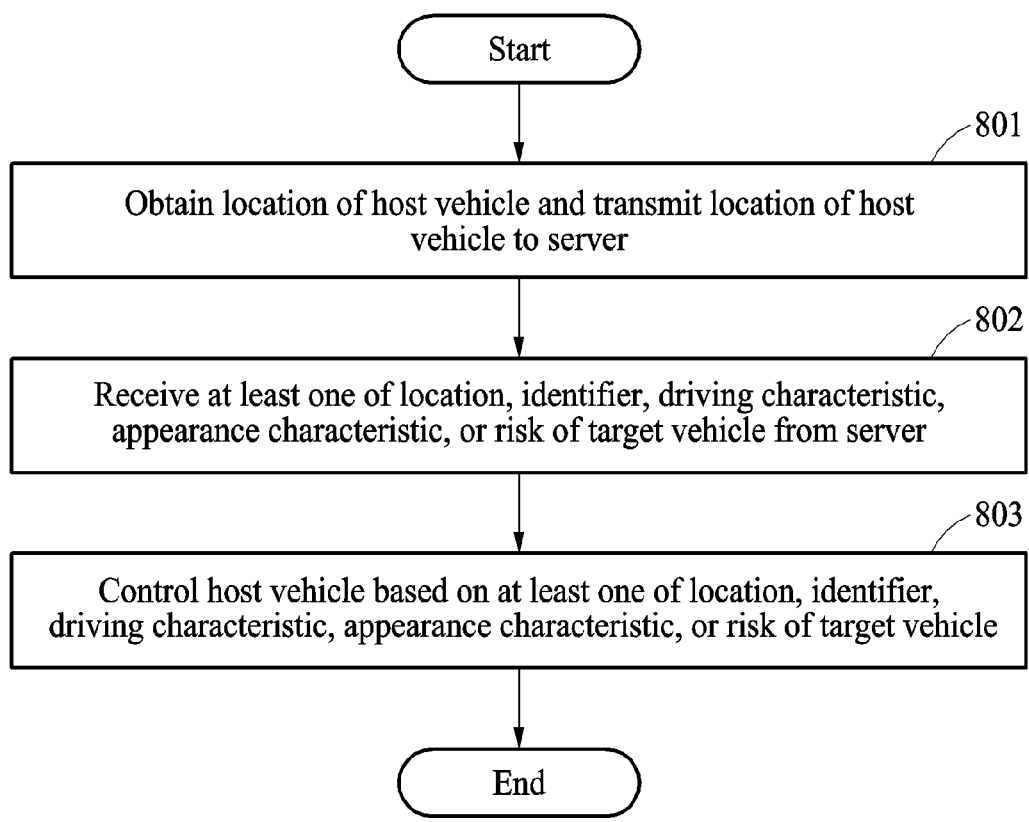

AUTONOMOUS DRIVING METHOD AND APPARATUS

CROSS-REFERENCE TO RELATED APPLICATIONS

This application claims the benefit under 35 USC § 119(a) of Korean Patent Application No. 10-2016-0112446 filed on Sep. 1, 2016, in the Korean Intellectual Property Office, the entire disclosure of which is incorporated herein by reference for all purposes.

BACKGROUND

1. Field

The following description relates to a method and apparatus for controlling an autonomous vehicle.

2. Description of Related Art

A host vehicle to which autonomous driving technology is applied may predict a path of a nearby vehicle, and may determine a possibility of collision based on the predicted path and relative movements between the host vehicle and the nearby vehicle. The host vehicle may control a driving path based on the possibility of collision with the nearby vehicle. However, even when the nearby vehicle performs dangerous driving, the host vehicle may determine that there is no possibility of collision based on predicted paths of the host vehicle and the nearby vehicle. In such a circumstance, the host vehicle may have difficulties in preparing for a potential risk of the nearby vehicle performing dangerous driving. In particular, in a case of an autonomous vehicle, a driver may not monitor a traffic situation. Thus, the host vehicle needs to determine a dangerous vehicle, among nearby vehicles.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an autonomous driving method includes: determining a risk of a target vehicle based on either one or both of a driving characteristic and an appearance characteristic of the target vehicle; and autonomously controlling a host vehicle based on the risk.

The driving characteristic may include a characteristic associated with a speed of the target vehicle.

The characteristic associated with the speed of the target vehicle may include any one or any combination of any two or more of the speed of the target vehicle, a speed of the target vehicle relative to the host vehicle, and a difference between the speed of the target vehicle and an average speed of a vehicle near the target vehicle. The determining of the risk of the target vehicle may include determining the risk of the target vehicle based on whether any one or any combination of any two or more of the speed of the target vehicle, the speed of the target vehicle relative to the host vehicle, and the difference between the speed of the target vehicle and the average speed of the vehicle near the target vehicle exceeds a threshold.

The driving characteristic may include variances in a speed of the target vehicle. The determining of the risk of the target vehicle may include determining the risk of the target vehicle based on whether a number of times that the variances exceed a threshold variance during a defined time period exceeds a defined value.

The driving characteristic may include a distance between the target vehicle and a vehicle ahead of the target vehicle. The determining of the risk of the target vehicle may include determining the risk of the target vehicle based on whether the distance is less than a threshold distance.

The driving characteristic may include a number of lane changes performed by the target vehicle during a defined time period. The determining of the risk of the target vehicle may include determining the risk of the target vehicle based on whether the number of lane changes exceeds a threshold number of lane changes.

The appearance characteristic may include an appearance of a part of the target vehicle. The determining of the risk of the target vehicle may include acquiring a standard image corresponding to the part based on a type of the target vehicle, measuring a stability of the part by comparing the appearance of the part with the standard image, and determining the risk of the target vehicle based on whether the stability of the part is less than a threshold.

The appearance characteristic may include an appearance of freight loaded on the target vehicle. The determining may include measuring a fall risk of the freight based on the appearance of the freight, and determining the risk of the target vehicle based on whether the fall risk exceeds a threshold.

The measuring of the fall risk may include: extracting a center of gravity of the target vehicle based on the appearance of the freight; obtaining a standard center of gravity corresponding to the target vehicle based on a type of the target vehicle; and generating the fall risk based on a difference between the center of gravity and the standard center of gravity.

The appearance characteristic may include an overall appearance of the target vehicle. The determining of the risk of the target vehicle may include acquiring a standard image corresponding to the overall appearance based on a type of the target vehicle, measuring a deterioration in the overall appearance by comparing the overall appearance with the standard image, and determining the risk of the target vehicle based on whether the deterioration exceeds a threshold deterioration.

The appearance characteristic may include a type of the target vehicle. The determining of the risk of the target vehicle may include determining the risk of the target vehicle based on an accident rate and a production year of the type.

The determining of the risk of the target vehicle may include: generating a feature vector based on either one or both of the driving characteristic and the appearance characteristic; inputting the feature vector into a neural network; and determining the risk of the target vehicle based on a vector output from the neural network.

The autonomous controlling of the host vehicle may include: adjusting a speed of the host vehicle based on the risk; and changing lanes of the host vehicle based on the risk and a lane of the target vehicle.

The autonomous driving method may further include: generating an identifier of the target vehicle based on the appearance characteristic of the target vehicle; and transmitting any one or any combination of any two or more of the identifier, the driving characteristic, the appearance characteristic, and the risk of the target vehicle to a vehicle near the host vehicle. The identifier may include any one or any combination of any two or more of a license plate, a type, and a color of the target vehicle.

The autonomous driving method may further include: generating an identifier of the target vehicle based on the appearance characteristic of the target vehicle; receiving any one or any combination of any two or more of a second identifier, a second driving characteristic, and a second appearance characteristic from a server or a vehicle near the host vehicle; and updating the risk based on either one or both of the second driving characteristic and the second appearance characteristic, in response to the second identifier being the same as the identifier.

A non-transitory computer-readable storage medium may store instructions that, when executed by a processor, cause the processor to perform the autonomous driving method.

In another general aspect, an autonomous driving method includes: obtaining a location of a host vehicle and transmitting the location to a server; receiving any one or any combination of any two or more of a location, an identifier, a driving characteristic, an appearance characteristic, and a risk of a target vehicle from the server; and controlling the host vehicle based on any one or any combination of any two or more of the location, the identifier, the driving characteristic, the appearance characteristic, and the risk of the target vehicle. The target vehicle is selected based on the location of the host vehicle.

The autonomous driving method may further include: generating a second identifier of a second target vehicle based on an appearance characteristic of the second target vehicle; transmitting the second identifier to the server; receiving any one or any combination of any two or more of a second driving characteristic, a second appearance characteristic, and a second risk corresponding to the second identifier from the server; and controlling the host vehicle based on any one or any combination of any two or more of the second driving characteristic, the second appearance characteristic, and the second risk.

The autonomous driving method may further include: transmitting any one or any combination of any two or more of the location, the identifier, the driving characteristic, the appearance characteristic, and the risk of the target vehicle to a vehicle near the host vehicle.

In another general aspect, an autonomous driving apparatus includes: a processor configured to determine a risk of a target vehicle based on either one or both of a driving characteristic and an appearance characteristic of the target vehicle, and control a host vehicle based on the risk.

The driving characteristic may include any one or any combination of any two or more of the speed of the target vehicle, a speed of the target vehicle relative to the host vehicle, and a difference between the speed of the target vehicle and an average speed of a vehicle near the target vehicle. The determining of the risk of the target vehicle may include determining the risk of the target vehicle based on whether any one or any combination of any two or more of the speed of the target vehicle, the speed of the target vehicle relative to the host vehicle, and the difference between the speed of the target vehicle and the average speed of the vehicle near the target vehicle exceeds a threshold.

The appearance characteristic may include an appearance of a part of the target vehicle. The determining of the risk of the target vehicle may include acquiring a standard image corresponding to the part based on a type of the target vehicle, measuring a stability of the part by comparing appearance of the part with the standard image, and determining the risk of the target vehicle based on whether the stability of the part is less than a threshold.

In another general aspect, an autonomous vehicle includes: a processor configured to determine a risk of a target vehicle based on an appearance characteristic of the target vehicle, and control a either one or both of a driving path and a speed of a host vehicle based on the risk.

The appearance characteristic may include any one or any combination of any two or more of an appearance of headlights, an appearance of side-view mirrors, an appearance of windshield wipers, an appearance of tires, an appearance of freight loaded on the target vehicle, and a type of the target vehicle.

The processor may be further configured to determine the risk of the target based on a driving characteristic of the target vehicle.

The driving characteristic may include either one or both of variances in a speed of the target vehicle and a number of lane changes performed by the target vehicle during a defined time period.

The autonomous vehicle may be one of an automobile, a motorcycle and a drone.

Other features and aspects will be apparent from the following detailed description, the drawings, and the claims.

BRIEF DESCRIPTION OF THE DRAWINGS

FIG. 7 is a flowchart illustrating an example of an autonomous driving method, according to an embodiment.

FIG. 8 is a flowchart illustrating an example of an autonomous driving method, according to an embodiment.

Figure 1A:
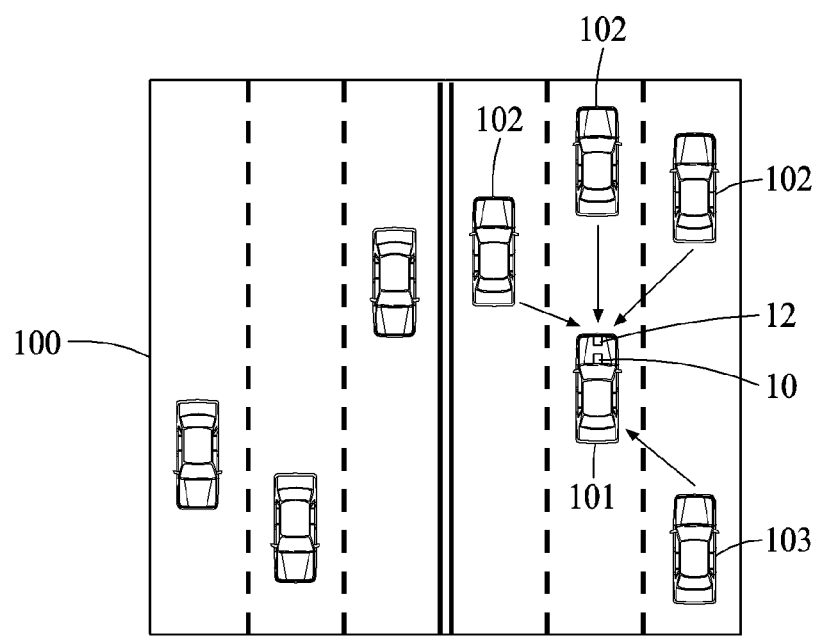
FIGS. 1A and 1B illustrate an example of an autonomous driving method, according to an embodiment.

Throughout the drawings and the detailed description, unless otherwise described or provided, the same drawing reference numerals refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, reference will now be made in detail to examples with reference to the accompanying drawings, wherein like reference numerals refer to like elements throughout.

Figure 1B:
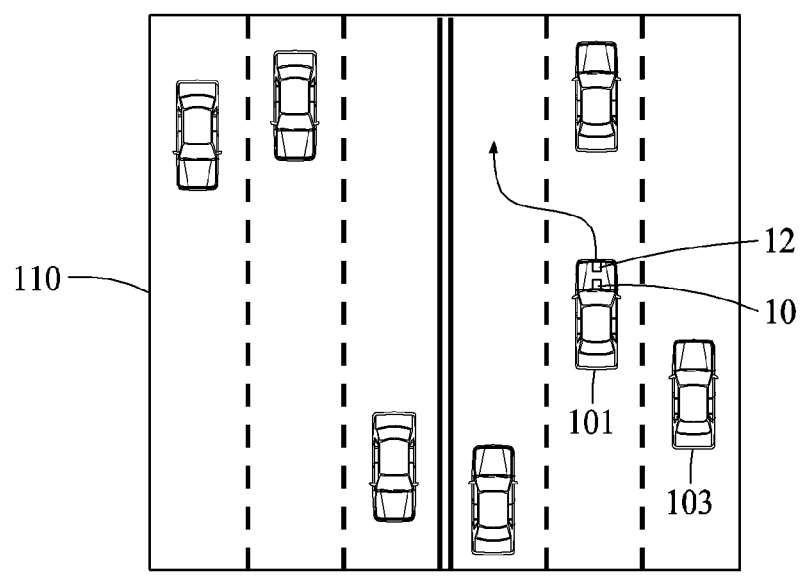

FIGS. 1A and 1B illustrate an example of an autonomous driving method performed using an autonomous driving apparatus 10, according to an embodiment. As used herein, the term "autonomous" refers to operations performed to control or operate a host vehicle using, for example, a computer, a processor or a controller, without human control or intervention.

The autonomous driving apparatus 10 is, for example, an apparatus that collects, processes, stores, or transmits data or instructions associated with autonomous driving of a host vehicle, or autonomous vehicle 101, or controls the autonomous driving, and may be implemented as software modules, hardware modules, or various combinations thereof. The autonomous driving apparatus 10 may be mounted on the host vehicle 101, or may be disposed outside of the host vehicle 101 to remotely control the host vehicle 101. The host vehicle 101 may be an automobile (e.g., a car or a truck) or a motorcycle, including an engine and/or a motor, and wheels for driving on a ground surface. Alternatively, the host vehicle 101 may be a drone, such as an unmanned aerial vehicle (UAV).

Referring to a scenario 100 of FIG. 1A, the host vehicle 101 is performing autonomous driving using the autonomous driving apparatus 10, and the autonomous driving apparatus 10 senses vehicles 102 and 103 near the host vehicle 101. The host vehicle 101 is a vehicle to be controlled by the autonomous driving apparatus 10. The vehicles 102 and 103 near the host vehicle 101 are vehicles located in a vicinity of the host vehicle 101, for example, vehicles located within a range defined based on a location of the host vehicle 101. In the example illustrated in FIG. 1A, nearby vehicles 102 are located ahead of the host vehicle 101, and nearby vehicle 103 is located behind the host vehicle 101.

At least one sensor or camera 12 of the host vehicle 101 senses the vehicles 102 and 103 near the host vehicle 101, for example, vehicles ahead, behind, and on both sides of the host vehicle 101. The autonomous driving apparatus 10 generates and stores a driving characteristic or an appearance characteristic of a nearby vehicle 102/103 based on data collected from the sensor and/or camera 12. The sensor and/or camera 12 includes, for example, any one or any combination of any two or more of an acceleration sensor, an image sensor, a radio detection and ranging (RADAR), a light detection and ranging (LiDAR), and a global positioning system (GPS) sensor. The driving characteristic is a characteristic associated with driving of the nearby vehicle 102/103, and includes, for example, a speed of the nearby vehicle 102/103, a number of lane changes of the nearby vehicle 102/103, a number of passings of the nearby vehicle 102/103, a level of lane keeping of the nearby vehicle 102/103, traffic rule compliance information of the nearby vehicle 102/103, overspeed information of the nearby vehicle 102/103, and a distance of the nearby vehicle 102/103 from a vehicle ahead. The appearance characteristic is a characteristic associated with an appearance of the nearby vehicle 102/103, and includes, for example, a stability of an appearance of a part of the nearby vehicle 102/103, a deterioration of the nearby vehicle 102/103, a type of the nearby vehicle 102/103, and a freight load stability of the nearby vehicle 102/103.

The autonomous driving apparatus 10 identifies each of the nearby vehicles 102 and 103 based on the data collected from the sensor or camera 12, and tracks and stores speeds, distances, and current lanes of the nearby vehicles 102 and 103. The autonomous driving apparatus 10 analyzes an image of the appearance of the part of the nearby vehicle 102/103, and recognizes whether parts necessary for driving, for example, headlights, side-view mirrors, windshield wipers, and tires, are abnormal or missing. Further, the autonomous driving apparatus 10 analyzes an image of a vehicle on which freight is loaded, among nearby vehicles 102 and 103, and detects whether an external structure is abnormal by recognizing whether the freight is loaded higher than a height of the vehicle, or whether an amount of freight exceeding a threshold amount of freight is loaded at a position higher than a reference position. In addition, the autonomous driving apparatus 10 analyzes an image of an overall appearance of a nearby vehicle 102/103, identifies a type, a model, and a production year of the nearby vehicle, and detects damaged or scratched parts.

The autonomous driving apparatus 10 determines a risk of (e.g., a risk or danger presented by) the nearby vehicle 102/103 based on the appearance characteristic of the nearby vehicle 102/103, the driving characteristic of the nearby vehicle 102/103, and records stored in association with the nearby vehicle 102/103. The autonomous driving apparatus 10 generates the risk of the nearby vehicle 102/103 by applying a relationship between predefined variables or a weight to the provided data. For example, the autonomous driving apparatus 10 determines, based on predefined criteria associated with the nearby vehicle 102/103, a case in which an average speed of the nearby vehicle 102/103 during a predefined time period is relatively high, sudden acceleration is performed a number of times by the nearby vehicle 102/103, or sudden deceleration is performed a number of times by the nearby vehicle 102/103, a case in which a distance between the nearby vehicle 102/103 and a vehicle ahead of the nearby vehicle 102/103 is relatively short, a case in which a number of lane changes are performed by the nearby vehicle 102/103, a case in which a part of the nearby vehicle 102/103 is damaged, missing or not installed suitably (for example, the side-view mirrors are folded), a case in which there is a possibility of an object falling from the nearby vehicle 102/103 due to an excessive amount of goods being loaded on by the nearby vehicle 102/103 in comparison to a structure of the nearby vehicle 102/103, a case in which a number of dents are observed in the nearby vehicle 102/103, a case in which the nearby vehicle 102/103 is a model with a high accident rate according to historical statistics of past accident rates, and a case in which a production year of the nearby vehicle 102/103 is long time prior to the current date, and calculates the risk of the nearby vehicle 102/103 by applying predefined weights to determination results.

Referring to a scenario 110 of FIG. 1B, among the vehicles 102 and 103 near the host vehicle 101, the nearby vehicle 103 is determined to have a risk greater than a defined or predefined criterion. In this example, the autonomous driving apparatus 10 controls the host vehicle 101 based on the risk of the nearby vehicle 103. For example, the autonomous driving apparatus 10 classifies the nearby vehicle 103 as an aggressive vehicle. In response to the nearby vehicle 103 approaching the host vehicle 101, the autonomous driving apparatus 10 reduces a speed of the host vehicle 101, and sets a path of the host vehicle 101 by increasing a weight of a left lane so that the host vehicle 101 moves into the left lane, away from the right lane, which is the lane of the nearby vehicle 103. Here, "near the host vehicle 101" refers to within a spatial range set by reflecting the risk of the nearby vehicle 103 based on the location of the host vehicle 101. Thus, the autonomous driving apparatus 10 controls the driving of the host vehicle 101 based on the risk of the nearby vehicle 103, thereby preparing for a sudden accident that may be caused by the nearby vehicle 103.

Figure 2:
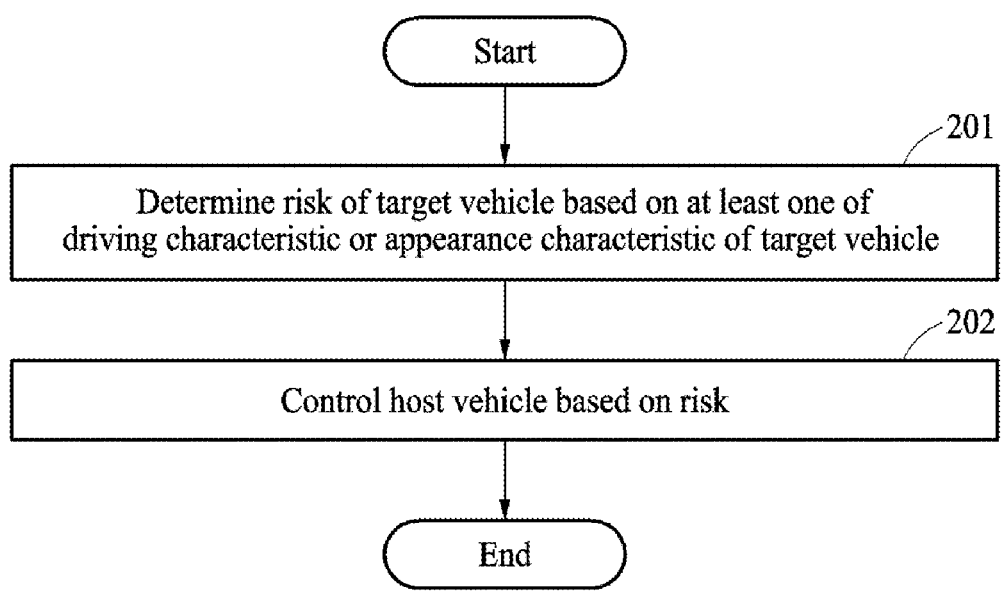
FIG. 2 is a flowchart illustrating an example of an autonomous driving method, according to an embodiment.

FIG. 2 is a flowchart illustrating an example of an autonomous driving method, according to an embodiment.

Referring to FIG. 2, in operation 201, the autonomous driving apparatus 10 (FIGS. 1A and 1B) determines a risk of a target vehicle based on either one or both of a driving characteristic and an appearance characteristic of the target vehicle. Referring to FIGS. 1A and 1B, the target vehicle is a vehicle targeted for risk determination, and includes, for example, vehicles among the nearby vehicles 102 and 103 that are near the host vehicle 101.

Referring back to FIG. 2, the driving characteristic of the target vehicle includes a characteristic associated with a speed of the target vehicle. For example, the characteristic associated with the speed of the target vehicle includes the speed (absolute) of the target vehicle, a speed of the target vehicle relative to the host vehicle 101 (speed of target vehicle–speed of host vehicle), and a speed of the target vehicle relative to at least one nearby vehicle 102/103. The at least one nearby vehicle 102/103 is at least one vehicle located in a vicinity of the target vehicle, and includes, for example, at least one vehicle located within a range defined based on the location of the target vehicle. The autonomous driving apparatus 10 determines the risk of the target vehicle based on the speed of the target vehicle. For example, based on risks preset in view of ranges of speed, the autonomous driving apparatus 10 updates the risk of the target vehicle to a risk corresponding to a range to which the speed of the target vehicle belongs. The autonomous driving apparatus 10 determines the risk of the target vehicle based on whether the speed of the target vehicle exceeds a threshold speed. The autonomous driving apparatus 10 also determines the risk of the target vehicle based on a difference between the speed of the target vehicle and an average speed of the at least one nearby vehicle 102/103. In response to the difference exceeding a threshold speed difference, the autonomous driving apparatus 10 increases the risk of the target vehicle. The thresholds may be predefined, and may vary and apply based on an intended operational design.

The driving characteristic of the target vehicle includes, for example, an average speed of the target vehicle during a predefined time period. The autonomous driving apparatus 10 compares the average speed of the target vehicle to a threshold average speed. The autonomous driving apparatus 10 determines the risk of the target vehicle by classifying the target vehicle as a dangerous vehicle in response to the average speed of the target vehicle being greater than the threshold average speed, and classifying the target vehicle as a non-dangerous vehicle in response to the average speed of the target vehicle being less than the threshold average speed. The autonomous driving apparatus 10 determines the risk of the target vehicle based on a value of risk expressed using a discrete value or a continuous value. However, the schemes of determining the risk of the target vehicle are not limited to the schemes described above, and various other schemes may be adopted and applied.

The autonomous driving apparatus 10 senses the speed of the target vehicle and a speed of a vehicle near the target vehicle using the sensor or camera 12 of the host vehicle 101. The autonomous driving apparatus 10 stores a graph of the speed of the target vehicle and the speed of the vehicle near the target vehicle with respect to time. The autonomous driving apparatus 10 analyzes the stored graph, and counts a number of times that a difference between the speed of the target vehicle and the speed of the vehicle near the target vehicle exceeds a threshold speed difference during a predefined time period. In response to the counted number of times exceeding a defined or predefined value, the autonomous driving apparatus 10 updates the risk of the target vehicle to a new value. For example, the autonomous driving apparatus 10 updates a value of risk to a greater value, and controls the host vehicle 101 based on the updated risk.

The driving characteristic of the target vehicle includes, for example, variances in the speed of the target vehicle. The autonomous driving apparatus 10 determines the risk of the target vehicle based on whether a number of times that the variances exceed a threshold variance exceeds a defined or predefined value. The autonomous driving apparatus 10 senses the speed of the target vehicle using the sensor or camera 12 of the host vehicle 101, and stores a graph of the sensed speed with respect to time. The autonomous driving apparatus 10 analyzes the stored graph, and counts a number of times that an instant slope exceeds a threshold slope during a predefined time period. In response to the counted number of times exceeding a defined or predefined value, the autonomous driving apparatus 10 increases the risk of the target vehicle. A point at which a slope exceeds the threshold slope is defined as sudden acceleration or sudden deceleration of the target vehicle.

The driving characteristic of the target vehicle includes, for example, a distance between the target vehicle and a vehicle ahead of the target vehicle. The autonomous driving apparatus 10 determines the risk of the target vehicle based on whether the distance is less than a threshold distance. The autonomous driving apparatus 10 senses relative positions of the host vehicle 101 and a nearby vehicle 102/103 near the host vehicle using the sensor or camera 12 of the host vehicle 101. The autonomous driving apparatus 10 calculates and stores the distance between the target vehicle and the vehicle ahead of the target vehicle based on the sensed relative positions. The autonomous driving apparatus 10 compares the distance between the target vehicle and the vehicle ahead of the target vehicle to distances between the nearby vehicles 102, 103 and vehicles ahead of the nearby vehicles 102, 103, and determines the risk of the target vehicle based on results of the comparison. For example, in response to a difference between the distance between the target vehicle and the vehicle ahead of the target vehicle and an average or intermediate value of the distances between the nearby vehicles and the vehicles ahead of the nearby vehicles being less than a threshold difference, the autonomous driving apparatus 10 increases the risk of the target vehicle. In the foregoing description, an example of evaluating the risk based on a location relationship between the target vehicle and the vehicle ahead of the target vehicle is described. However, the autonomous driving apparatus 10 may also evaluate the risk of the target vehicle based on a location relationship between the target vehicle and a vehicle behind or on a side of the target vehicle. Further, the autonomous driving apparatus 10 may evaluate the risk of the target vehicle based on a location relationship between the target vehicle and a vehicle near the target vehicle by applying the scheme described above.

The driving characteristic of the target vehicle includes, for example, a number of lane changes performed by the target vehicle during a defined or predefined time period. The autonomous driving apparatus 10 determines the risk of the target vehicle based on whether the number of lane changes exceeds a threshold number of lane changes. The autonomous driving apparatus 10 recognizes and stores lanes of the target vehicle using the sensor or camera 12 of the host vehicle 101. The autonomous driving apparatus 10 counts the number of lane changes based on the lanes of the target vehicle recognized during the predefined time period, and compares the counted number of lane changes to the threshold number of lane changes.

The driving characteristic of the target vehicle includes, for example, a lane-keeping time of the target vehicle during a defined or predefined time period. The autonomous driving apparatus 10 measures and stores lane-keeping time using the sensor or camera 12 of the host vehicle 101. The autonomous driving apparatus 10 determines the risk of the target vehicle based on whether a ratio of the lane-keeping time to the predefined time period is less than a threshold lane-keeping time. Here, keeping a lane is defined as not driving on left and right lane markings, and not leaning toward one of the left and right lane markings at a ratio exceeding a predefined ratio.

The appearance characteristic of the target vehicle includes, for example, an appearance of a part of the target vehicle, such as a headlight, a side-view mirror, a windshield wiper, or a tire. The autonomous driving apparatus 10 acquires an image of the target vehicle using the camera 12 of the host vehicle 101, and recognizes the appearance of the part of the target vehicle from the image of the target vehicle. The autonomous driving apparatus 10 measures a stability of the part based on the recognized appearance of the part, and determines the risk of the target vehicle based on whether the measured stability of the part is less than a threshold stability. To measure the stability of the part, the autonomous driving apparatus acquires a standard image corresponding to the part based on a type of the target vehicle. Here, the standard image is an image that models an appearance of a normal part matched to the type of the target vehicle. The autonomous driving apparatus matches the appearance of the part recognized through the camera 12 of the host vehicle 101 and the standard image, and measures the stability of the part based on a matching degree.

The autonomous driving apparatus 10 measures the stability of the part or the risk of the target vehicle using, for example, a deep learning based algorithm. For example, the autonomous driving apparatus 10 adopts a neural network trained based on images of normal parts and images of abnormal parts. The autonomous driving apparatus 10 generates a feature vector from the appearance of the part of the target vehicle, and obtains an output vector by inputting the generated feature vector into the trained neural network. The autonomous driving apparatus 10 obtains the stability of the part or the risk of the target vehicle represented by the output vector. The autonomous driving apparatus 10 generates the feature vector by combining appearances of parts of the target vehicle, and obtains an output vector representing the overall stability of the parts of the target vehicle by inputting the generated feature vector into the neural network. Further, the autonomous driving apparatus 10 generates respective feature vectors of the appearances of the parts of the target vehicle, and measures respective stabilities of the parts of the target vehicle by inputting the generated feature vectors into neural networks corresponding to the parts, respectively. However, the method or scheme of adopting the deep learning based algorithm is not limited to the scheme described above, and various schemes may be applied.

The appearance characteristic of the target vehicle includes, for example, an appearance of freight loaded on the target vehicle. The autonomous driving apparatus 10 acquires an image of the target vehicle using the camera 12 of the host vehicle 101, and recognizes the appearance of the freight loaded on the target vehicle from the image of the target vehicle. The autonomous driving apparatus 10 measures a fall risk of the freight based on the appearance of the freight, and determines the risk of the target vehicle based on whether the fall risk exceeds a threshold fall risk. To measure the fall risk of the freight, the autonomous driving apparatus 10 extracts, from the recognized image, a center of gravity of the target vehicle on which the freight is loaded. The autonomous driving apparatus 10 identifies a type of the target vehicle from the recognized image, and obtains a standard center of gravity corresponding to the target vehicle based on the identified type. The autonomous driving apparatus 10 measures the fall risk of the freight based on a difference between the extracted center of gravity and the standard center of gravity. For example, the autonomous driving apparatus 10 increases the fall risk of the freight in response to the extracted center of gravity being beyond a defined or predefined range from the standard center of gravity.

The autonomous driving apparatus 10 measures the fall risk of the freight or the risk of the target vehicle using, for example, a deep learning based algorithm. For example, the autonomous driving apparatus 10 adopts a neural network trained based on images of normal vehicles and images of vehicles on which freight is loaded at relatively high fall risks. The neural network is trained for each vehicle type, or irrespective of a vehicle type. The autonomous driving apparatus 10 generates a feature vector from an image of the target vehicle on which the freight is loaded, and obtains an output vector by inputting the generated feature vector into the trained neural network. The autonomous driving apparatus obtains the fall risk or the risk of the target vehicle represented by the output vector.

The appearance characteristic of the target vehicle includes, for example, an overall appearance of the target vehicle. The autonomous driving apparatus 10 acquires an image of the target vehicle using the camera 12 of the host vehicle 101, and recognizes the overall appearance of the target vehicle from the image of the target vehicle. The overall appearance of the target vehicle refers to an exterior of the target vehicle that may be visually determined, and includes a contour and/or a color of the target vehicle. The autonomous driving apparatus 10 measures a deterioration in the overall appearance based on the overall appearance of the target vehicle, and determines the risk of the target vehicle based on whether the measured deterioration exceeds a threshold deterioration. To measure the deterioration in the overall appearance of the target vehicle, the autonomous driving apparatus 10 identifies a type of the target vehicle from the recognized image, and acquires a standard image corresponding to the overall appearance of the target vehicle based on the identified type. The autonomous driving apparatus 10 matches the overall appearance of the target vehicle and the standard image, and measures the deterioration in the overall appearance based on a matching degree. For example, in response to a number of dents or corrosions being observed in the overall appearance of the target vehicle, the autonomous driving apparatus 10 increases the deterioration in the overall appearance of the target vehicle.

The autonomous driving apparatus 10 measures the deterioration in the overall appearance of the target vehicle or the risk of the target vehicle using a deep learning based algorithm. For example, the autonomous driving apparatus 10 adopts a neural network trained based on images of overall appearances of normal vehicles and image of overall appearances of deteriorated vehicle. The neural network is trained for each vehicle type, or irrespective of a vehicle type. The autonomous driving apparatus 10 generates a feature vector representing the overall appearance of the target vehicle from the image of the target vehicle, and obtains an output vector by inputting the generated feature vector into the trained neural network. The autonomous driving apparatus 10 obtains the deterioration in the overall appearance or the risk of the target vehicle represented by the output vector.

The appearance characteristic of the target vehicle includes, for example, a type of the target vehicle. The type of the target vehicle includes, for example, a model and a production year to be utilized to identify the target vehicle. The autonomous driving apparatus 10 identifies the type of the target vehicle from an image of the target vehicle acquired using the sensor or camera 12 of the host vehicle 101. The autonomous driving apparatus 10 determines the risk of the target vehicle based on an accident rate of the type of the target vehicle. The autonomous driving apparatus 10 calculates the risk of the target vehicle based on statistics related to the accident rate of the type of the target vehicle. The autonomous driving apparatus 10 obtains the accident rate from a memory or a server. More specifically, for example, the autonomous driving apparatus 10 obtains the accident rate corresponding to the identified type from an open cloud that is freely (e.g., with unrestricted access authority) corrected and edited, a cloud for which an access authority is restricted, or a server of an insurance company or vehicle manufacturer. The autonomous driving apparatus 10 determines the risk of the target vehicle based on a production year identified from the image of the target vehicle. For example, in response to the production year being a long time prior to a present date when compared to a defined or predefined criterion, the autonomous driving apparatus 10 increases the risk of the target vehicle.

The autonomous driving apparatus 10 measures the risk of the target vehicle using, for example, a deep learning based algorithm. For example, the autonomous driving apparatus 10 adopts a neural network trained based on high-risk driving characteristics, high-risk appearance characteristics, low-risk driving characteristics, and low-risk appearance characteristics. The neural network is trained for each vehicle type, or irrespective of a vehicle type. The autonomous driving apparatus 10 generates a feature vector representing a characteristic of the target vehicle based on either one or both of the driving characteristic and the appearance characteristic of the target vehicle. The autonomous driving apparatus 10 obtains an output vector by inputting the generated feature vector into the trained neural network. The autonomous driving apparatus 10 obtains the risk of the target vehicle represented by the output vector.

The risk of the target vehicle is measured at points, for example, at a real number value out of a possible 1 point or at a discrete level.

In operation 202, the autonomous driving apparatus 10 controls the host vehicle 101 based on the risk of the target vehicle. For example, the autonomous driving apparatus 10 controls a speed, a direction, and a lane of the host vehicle based on the risk of the target vehicle. For example, the autonomous driving apparatus 10 decreases the speed of the host vehicle 101 to a speed lower than the original speed by a preset ratio based on the risk represented as points. The autonomous driving apparatus 10 measures points of risks of nearby vehicles 102 and 103 near the host vehicle, and assigns weights to the nearby vehicles 102 and 103 based on the points of the risks. The autonomous driving apparatus 10 adjusts the speed of the host vehicle 101 based on the nearby vehicles 102 and 103 to which the weights are assigned. For example, the autonomous driving apparatus 10 adjusts the speed of the host vehicle 101 based on the weights and directions from the nearby vehicle 102/103 toward the host vehicle 101.

The autonomous driving apparatus 10 changes lanes of the host vehicle 101 based on the risk and a lane of the target vehicle, among the nearby vehicles 102 and 103. For example, the autonomous driving apparatus 10 controls the host vehicle to move apart from the lane of the target vehicle based on the risk represented as points. The autonomous driving apparatus assigns weights to nearby vehicles 102 and 103 near the host vehicle based on points of risks of the nearby vehicles 102 and 103, and sets a lane or a path of the host vehicle 101 based on lanes of the nearby vehicles 102 and 103 to which the weights are assigned, location relations between the host vehicle 101 and the nearby vehicles 102 and 103, and the weights.

Figure 3A:
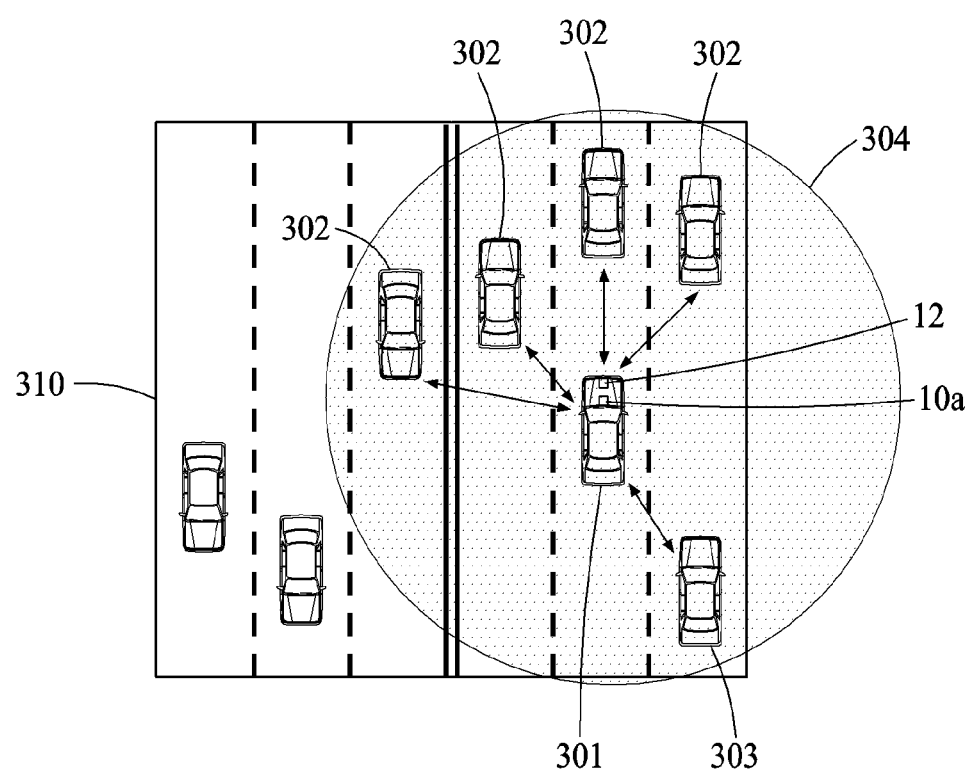
FIGS. 3A and 3B illustrate an example of an autonomous driving method, according to an embodiment.
Figure 3B:
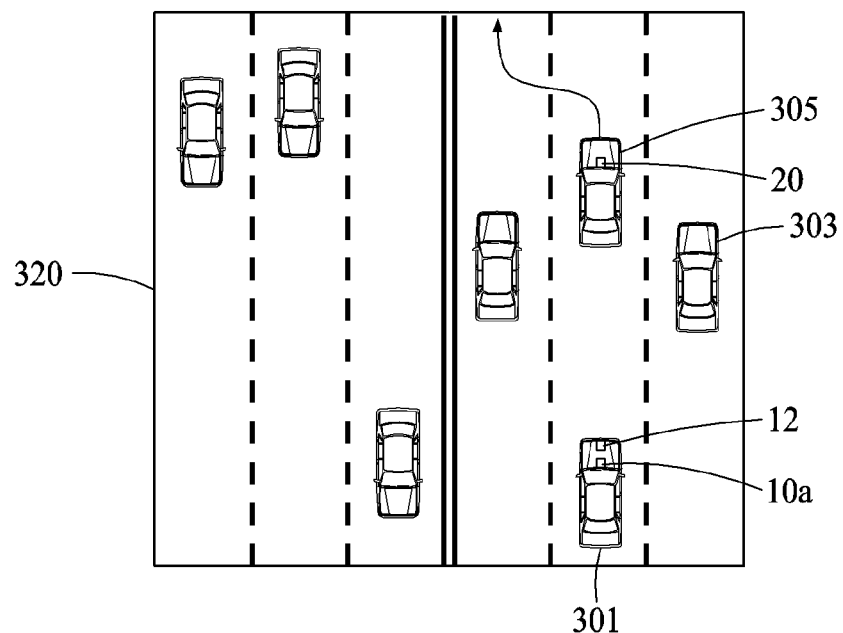

FIGS. 3A and 3B illustrate an example of an autonomous driving method, according to an embodiment.

Referring to a scenario 310 of FIG. 3A, the autonomous driving apparatus 10a of a host vehicle 301 measures risks of nearby vehicles 302 and 303 within a range 304 defined based on a location of the host vehicle 301. However, there is limitation in that the autonomous driving apparatus 10a of the host vehicle 301 measures only the risks of the nearby vehicles 302 and 303 during a limited time period within the limited range 304. If, among the nearby vehicles 302 and 303, the target vehicle 303 is determined to have a high risk, the autonomous driving apparatus 10a generates an identifier of the target vehicle 303, and stores the identifier to be mapped to the risk. However, if the target vehicle 303 passes the host vehicle 301, the autonomous driving apparatus 10a of the host vehicle 301 may not utilize data analyzed in relation to the target vehicle 303.

The host vehicle 301 may be an automobile (e.g., a car or a truck) or a motorcycle, including an engine and/or a motor, and wheels for driving on a ground surface. Alternatively, the host vehicle 301 may be a drone, such as an unmanned aerial vehicle (UAV).

In this example, referring to a scenario 320 of FIG. 3B, the autonomous driving apparatus 10a of the host vehicle 301 transmits data related to the target vehicle 303, for example, the identifier or the risk of the target vehicle 303, to a vehicle 305 ahead of the host vehicle 301. Here, the data is transmitted using a cloud, or a local area network or low power local area network established between the vehicles 301 and 305. An autonomous driving apparatus 20 of the vehicle 305 receiving the data related to the target vehicle 303 controls a speed, a lane, or a path of the vehicle 305 based on the received data. The autonomous driving apparatus 10a of the host vehicle 301 obtains the identifier or risk of the target vehicle 303 which is behind the host vehicle 301, and transmits the obtained identifier or risk to the vehicle 305 which is ahead of the host vehicle 301. The autonomous driving apparatus 20 of the vehicle 305, having received the identifier or risk of the target vehicle 303, senses that the target vehicle 303 is approaching, and controls a path of the vehicle 305 such that the vehicle 305 may avoid the target vehicle 303.

Such a data sharing system is established using a local area network or low power local area network between vehicles, or established using a cloud system shared based on locations of vehicles. A risk of a target vehicle 303 is shared while being combined with any one or any combination of any two or more of a license plate, a location, a type such as a model or a production year, and a color of the target vehicle 303. The autonomous driving apparatus 10a receives identifiers and risks of nearby vehicles 302 and 303 (FIG. 3A) near the host vehicle 301 in real time, from the network or the cloud, and controls the host vehicle 301 based on the received identifiers and risks. Here, the location of the target vehicle 303 is obtained using, for example, a GPS positioning scheme using terminals equipped with GPS chip sets, a proximity scheme that approximates to a location of a cell base station to which a terminal belongs, a trigonometric positioning scheme using time of arrival/time difference of arrival (TOA/TDOA), or a proximity scheme that approximates to a location of a wireless fidelity access point (WiFi AP) connected in a wireless location area network (WLAN) environment.

Figure 4:
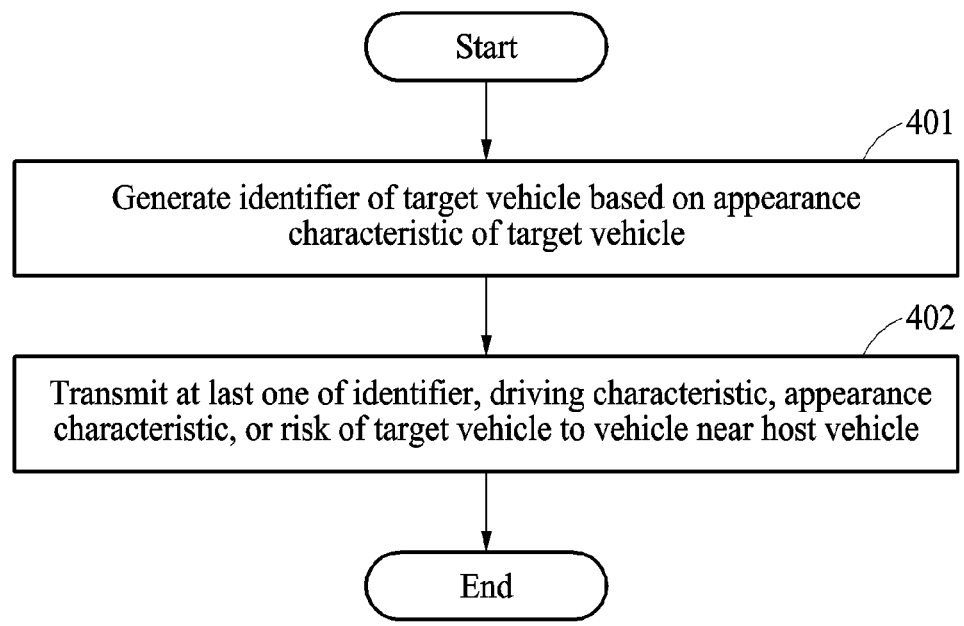
FIG. 4 is a flowchart illustrating an example of an autonomous driving method, according to an embodiment.

FIG. 4 is a flowchart illustrating an example of an autonomous driving method, according to an embodiment.

Referring to FIG. 4, in operation 401, an autonomous driving apparatus 10a (FIGS. 3A and 3B) generates an identifier of a target vehicle 303 (FIGS. 3A and 3B) based on an appearance characteristic of the target vehicle 303. The identifier includes any one or any combination of any two or more of a license plate, a type, and a color of the target vehicle. The autonomous driving apparatus 10a extracts the identifier of the target vehicle from an image of the target vehicle acquired from a camera or sensor 12 (FIGS. 3A and 3B) of the host vehicle 301 (FIGS. 3A and 3B).

In operation 402, the autonomous driving apparatus 10a transmits at least one of the identifier, a driving characteristic, the appearance characteristic, or a risk of the target vehicle 303 to a vehicle 305 near the host vehicle 301. Here, data is transmitted to the nearby vehicle 305 using Bluetooth between the vehicles 301 and 305, beacons, or short range communication such as infrared communication. For example, the beacons include low-frequency beacons, light emitting diode (LED) beacons, WiFi beacons, and Bluetooth beacons. The autonomous driving apparatus 10a of the host vehicle 301 detects a location of the host vehicle and a location of the target vehicle 303, and transmits any one or any combination of any two or more of the detected locations, the identifier, the driving characteristic, the appearance characteristic, and the risk of the target vehicle 303 to a cloud. The cloud transmits any one or any combination of any two or more of the identifier, the driving characteristic, the appearance characteristic, and the risk of the target vehicle 303 to the vehicle 305 near the host vehicle based on the location of the host vehicle 301 and the location of the target vehicle 301. The cloud is established using an open network with no access restriction, or established using a closed network with access restriction. The cloud established using the closed network is implemented in a manner such that only an autonomous driving apparatus 10a adopting the same type of autonomous driving algorithm is allowed to access, or data to be shared is encoded to be uploaded or downloaded. The foregoing example of establishing the cloud may be applied or modified in various manners.

The autonomous driving apparatus 10a of the host vehicle 301 generates the identifier of the target vehicle 303 based on the appearance characteristic of the target vehicle 303, and receives any one or any combination of any two or more of a second identifier, a second driving characteristic, and a second appearance characteristic from a server or the vehicle 305 near the host vehicle 301. In response to the generated identifier being the same as the received second identifier, the autonomous driving apparatus 10a updates the risk of the target vehicle 303 based either one or both of the second driving characteristic and the second appearance characteristic. The autonomous driving apparatus 10a measures or updates the risk of the target vehicle 303 by combining the data obtained from the camera or sensor 12 of the host vehicle 301 and the data received from the nearby vehicle 305 or server. Here, the server includes a server implemented in a form of a cloud.

Figure 5:
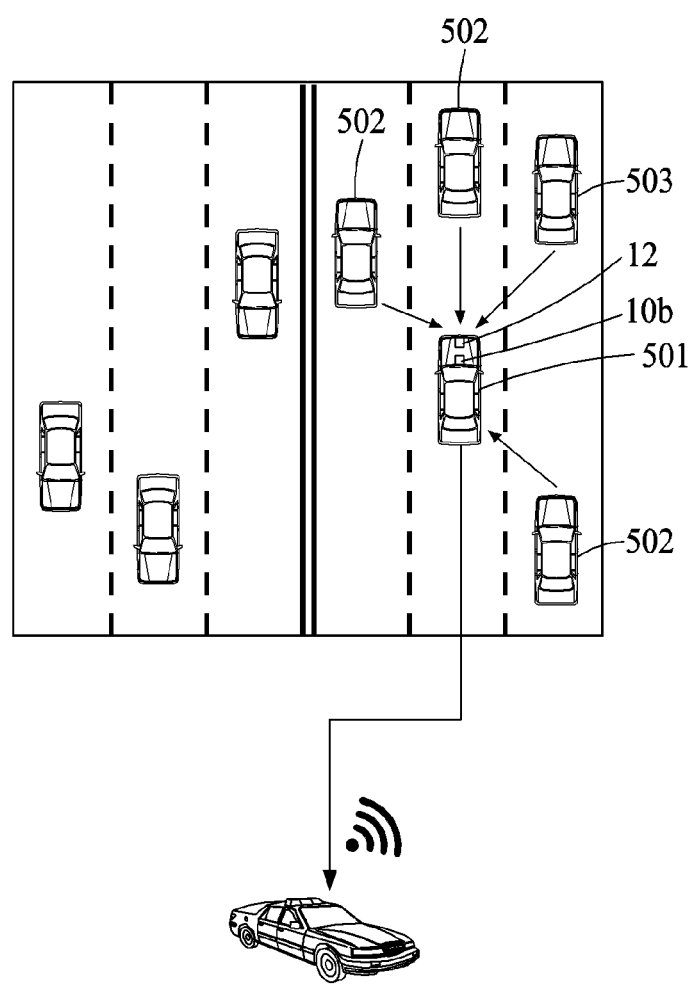
FIG. 5 illustrates an example of an autonomous driving method, according to an embodiment.

FIG. 5 illustrates an example of an autonomous driving method, according to an embodiment.

Referring to FIG. 5, an autonomous driving apparatus 10b of a host vehicle 501 determines traffic rule compliance information of nearby vehicles 502 and 503 near the host vehicle 501. The host vehicle 501 may be an automobile (e.g., a car or a truck) or a motorcycle, including an engine and/or a motor, and wheels for driving on a ground surface. Alternatively, the host vehicle 501 may be a drone, such as an unmanned aerial vehicle (UAV).

The autonomous driving apparatus 10b of the host vehicle 501 determines the traffic rule compliance information by applying the examples described above. The autonomous driving apparatus 10b of the host vehicle 501 determines whether a speed of the nearby vehicle 503 exceeds a speed limit by a predefined or greater proportion based on a traffic rule applied at a location of the nearby vehicle 503. The autonomous driving apparatus 10b transmits, to a server, and records on an identifier, the location, a violation time, and the speed of the nearby vehicle 503 which violates the traffic rule. The server may be a server operated by an entity, such as a police department, that manages traffic rules or roads.

Figure 6A:
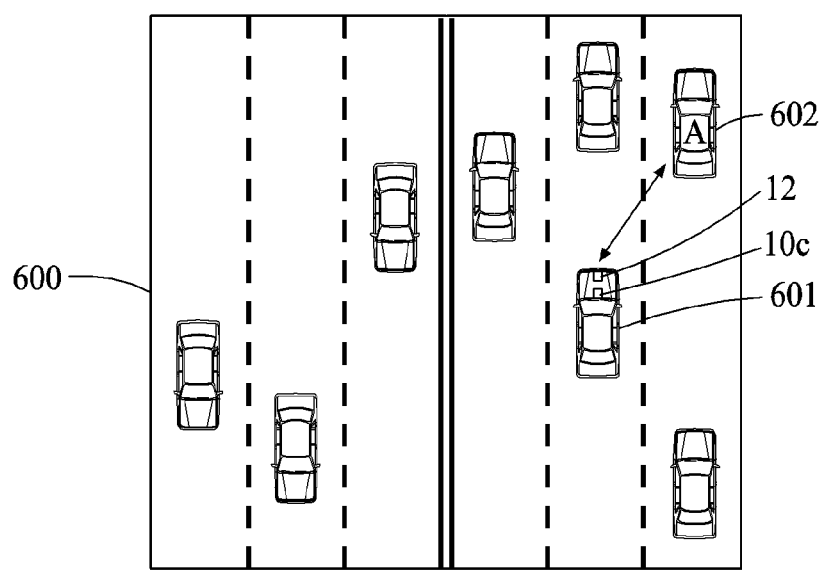
FIGS. 6A and 6B illustrate an example of an autonomous driving method, according to an embodiment.
Figure 6B:
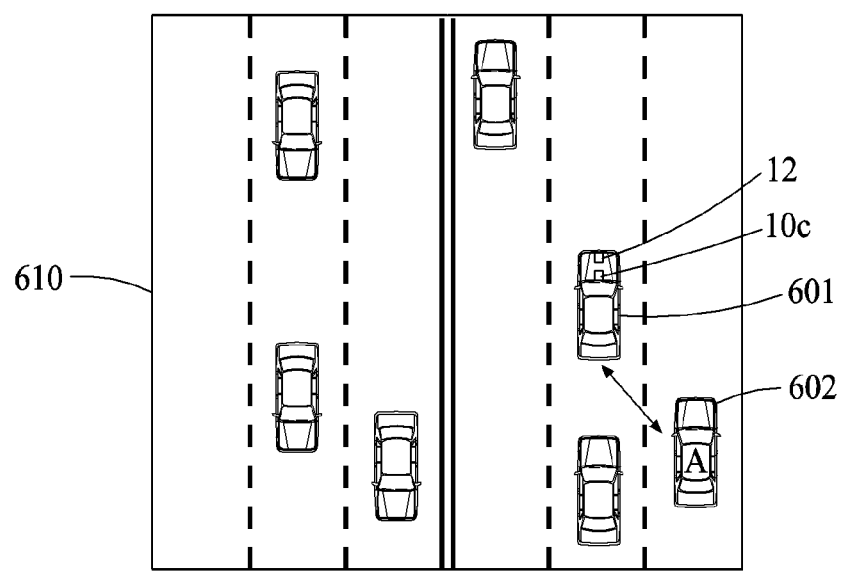

FIGS. 6A and 6B illustrate an example of an autonomous driving method, according to an embodiment.

Referring to a scenario 600 of FIG. 6A, an autonomous driving apparatus 10c of a host vehicle 601 determines a risk of a target vehicle 602, and stores the risk to be associated with an identifier A of the target vehicle 602. The autonomous driving apparatus 10c of the host vehicle 601 obtains identifiers of nearby vehicles. In response to one of the obtained identifiers matching the stored identifier A, the autonomous driving apparatus 10c of the host vehicle 601 obtains the stored risk corresponding to the stored identifier A. Referring to a scenario 610 of FIG. 6B, in response to the risk corresponding to the identifier A being obtained, the autonomous driving apparatus 10c of the host vehicle 601 controls the host vehicle 601 based on the risk of the target vehicle 602. That is, according to the embodiment illustrated in FIGS. 6A and 6B, an autonomous driving apparatus stores a measured risk to be mapped to an identifier of a target vehicle, and controls a host vehicle based on the stored risk in response to an identifier the same as the stored identifier being sensed during driving of the host vehicle.

The host vehicle 601 may be an automobile (e.g., a car or a truck) or a motorcycle, including an engine and/or a motor, and wheels for driving on a ground surface. Alternatively, the host vehicle 601 may be a drone, such as an unmanned aerial vehicle (UAV).

FIG. 7 is a flowchart illustrating an example of an autonomous driving method, according to an embodiment.

Referring to FIG. 7, in operation 701, an autonomous driving apparatus generates an identifier of a target vehicle based on an appearance characteristic of the target vehicle. In operation 702, the autonomous driving apparatus obtains a second risk corresponding to the generated identifier, among stored identifiers. The second risk is a stored risk, which is distinct from a risk of the target vehicle measured by the autonomous driving apparatus in real time. In operation 703, the autonomous driving apparatus updates the risk of the target vehicle based on the obtained second risk. The autonomous driving apparatus updates the risk of the target vehicle by applying weights to the stored second risk and the risk measured in real time.

FIG. 8 is a flowchart illustrating an example of an autonomous driving method, according to an embodiment.

Referring to FIG. 8, in operation 801, an autonomous driving apparatus obtains a location of a host vehicle and transmits the location of the host vehicle to a server. The server is, for example, a server established using the cloud described above, and the location of the host vehicle is obtained using, for example, a GPS positioning scheme.

In operation 802, the autonomous driving apparatus receives any one or any combination of any two or more of a location, an identifier, a driving characteristic, an appearance characteristic, and a risk of a target vehicle from the server. The server searches a database for risks of vehicles near the host vehicle based on the location of the host vehicle. The server selects the target vehicle from nearby vehicles within a range set based on the location of the host vehicle. The server transmits any one or any combination of any two or more of the location, the identifier, the driving characteristic, the appearance characteristic, and the risk of the target vehicle to the autonomous driving apparatus of the host vehicle in response to the location of the host vehicle being received.

In operation 803, the autonomous driving apparatus controls the host vehicle based on any one or any combination of any two or more of the location, the identifier, the driving characteristic, the appearance characteristic, and the risk of the target vehicle. The descriptions of controlling a host vehicle provided above are applied to control the host vehicle.

Figure 9:
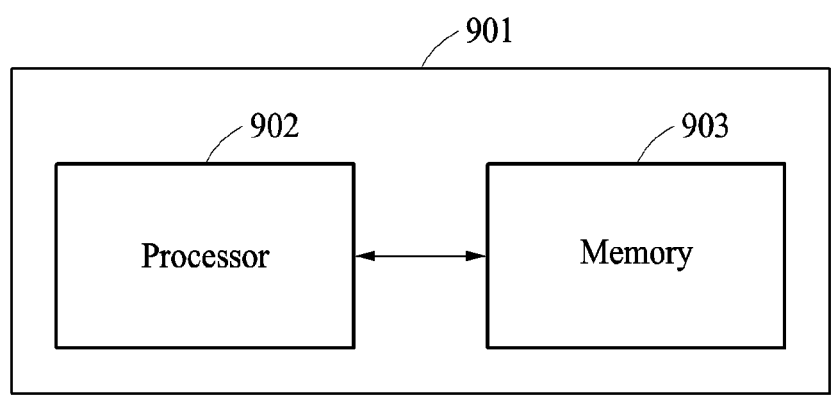
FIG. 9 is a block diagram illustrating an example of an autonomous driving apparatus, according to an embodiment.

FIG. 9 is a block diagram illustrating an example of an autonomous driving apparatus 901, according to an embodiment. The features and components of the autonomous driving apparatus 901 may apply to the autonomous driving apparatuses 10, 10a, 10b and 10c described in the previous embodiments.

Referring to FIG. 9, the autonomous driving apparatus 901 includes a processor 902 and a memory 903. The memory 903 is configured to record programs configured to process instructions associated with autonomous driving, and record instructions to perform the operations described with reference to FIGS. 1A through 8. The memory 903 is configured to record data sensed from a sensor or camera of a host vehicle, and record any one or any combination of any two or more of a driving characteristic, an appearance characteristic, and a risk generated by the processor 902 to be associated with an identifier.

The processor 902 loads and executes the programs recorded in the memory 903. The processor 902 determines a risk of a target vehicle based on either one or both of a driving characteristic and an appearance characteristic of the target vehicle, and controls the host vehicle based on the determined risk. The examples described above apply to the operations of the processor 902, and thus duplicated descriptions will be omitted herein for conciseness.

Figure 10:
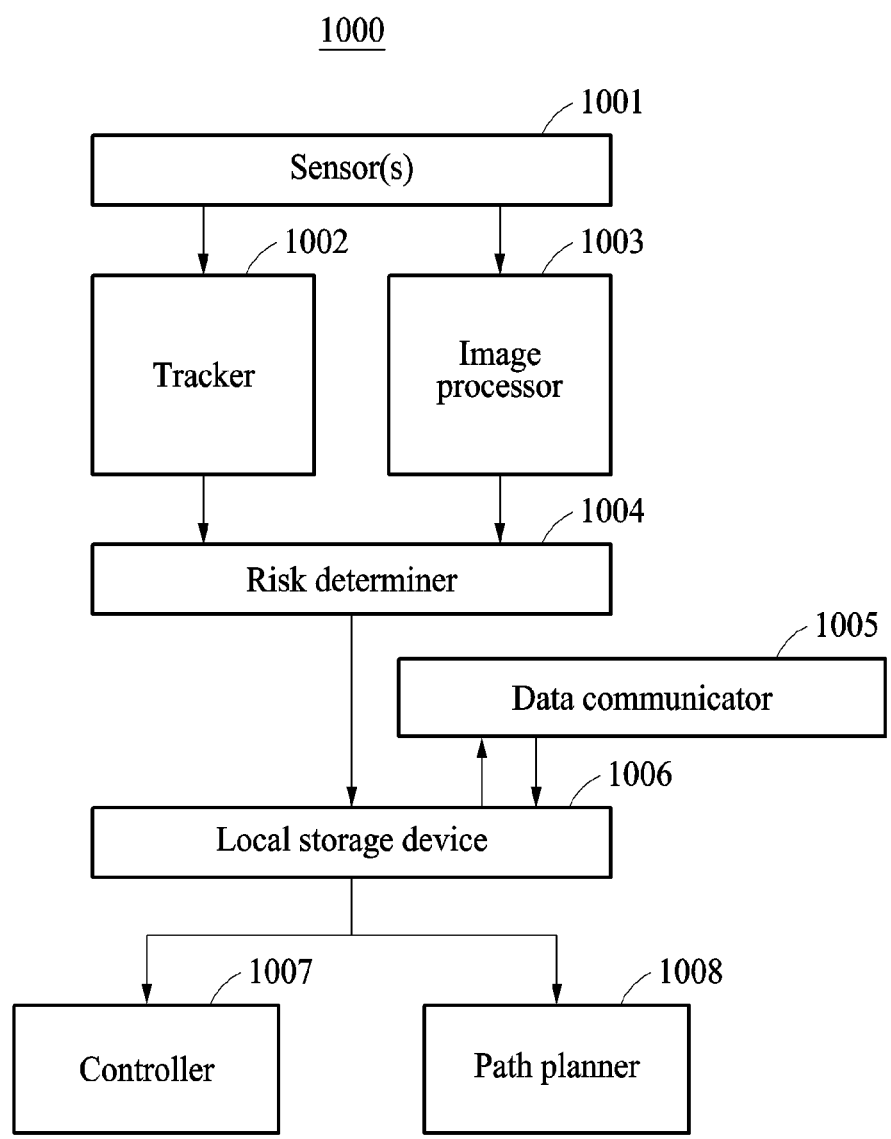
FIG. 10 is a block diagram illustrating an example of an autonomous driving apparatus, according to an embodiment.

FIG. 10 is a block diagram illustrating an example of an autonomous driving apparatus 1000, according to an embodiment. The features and components of the autonomous driving apparatus 1000 may apply to the autonomous driving apparatuses 10, 10a, 10b, 10c and 901 described in the previous embodiments.

Referring to FIG. 10, the autonomous driving apparatus 1000 includes sensor(s) 1001, a tracker 1002, an image processor 1003, a risk determiner 1004, a data communicator 1005, a local storage device 1006, a controller 1007, and a path planner 1008. The sensor(s) 1001 includes a camera, a RADAR, a LiDAR, a GPS, and/or other sensors. The sensor(s) 1001 senses data such as a shape, a feature, and a movement of an object (for example, a vehicle) near a host vehicle, and transmits the sensed data to the tracker 1002 and the image processor 1003.

The tracker 1002 recognizes, for example, an overall appearance, a trajectory, and a license plate of the vehicle, classifies the data obtained from the sensor(s) 1001 for each vehicle over time, calculates speeds of vehicles, and records the calculated speeds consecutively. For each of vehicles near the host vehicle, the tracker 1002 calculates a distance between a nearby vehicle and a vehicle ahead of the nearby vehicle, and records the calculated distance. Further, the tracker 1002 recognizes lanes on a road, and records lanes on which the nearby vehicles are located.

The image processor 1003 records overall appearances of the nearby vehicles based on the data obtained from the sensor(s) 1001. The image processor 1003 determines whether headlights, side-view mirrors, windshield wipers, and tires necessary for driving are abnormal by analyzing an image of a nearby vehicle. The image processor 1003 measures a fall risk of loaded freight by analyzing the image of the nearby vehicle. The image processor 1003 measures a deterioration in the overall appearance of the nearby vehicle by analyzing the image of the nearby vehicle. The image processor 1003 identifies a type, for example, a model and a production year, by analyzing the image of the nearby vehicle.

The risk determiner 1004 determines a risk of the nearby vehicle based on data analyzed by the tracker 1002 and the image processor 1003, stored data, and/or data obtained from a server. For example, points of the risk of the nearby vehicle are calculated based on the following criteria:
(1) speed information including an average speed during a predefined time period, a sudden acceleration count, and a sudden deceleration count;
(2) location information including a distance from a vehicle ahead during a predefined time period, and a number of lane changes;
(3) vehicle appearance information including a stability of a part such as a headlight, a side-view mirror, a windshield wiper, or a tire, a freight load stability, and a vehicle deterioration level; and
(4) type information including a model and a production year.

A case in which the risk is to increase includes a case in which the average speed is relatively high, sudden acceleration is performed a number of times, or sudden deceleration is performed a number of times, a case in which the distance from the vehicle ahead is excessively short, or a number of lane changes are performed, a case in which a part is not installed suitably (for example, a side-view mirror is folded), a case in which there is a possibility of an object falling due to an excessive amount of goods being loaded on the nearby vehicle in comparison to a structure of the nearby vehicle, a case in which a number of dents are observed in the nearby vehicle, a case in which the nearby vehicle is a model with a high accident rate according to historical statistics of pass accident rates, and a case in which the production year of the nearby vehicle is a long time prior to the current date. The risk is calculated by applying respective weights to the cases.

The local storage device 1006 stores the identifier and the risk of the nearby vehicle. The data communicator 1005 transmits the data stored in the local storage device 1006 to the nearby vehicle. The controller 1007 determines a speed and a direction of the host vehicle based on the risk of the nearby vehicle. The path planner 1008 determines a path of the host vehicle based on the risk of the nearby vehicle. For example, in response to a high-risk vehicle being close to the host vehicle, the controller 1007 reduces the speed of the host vehicle to a speed lower than the original speed by a preset ratio so as to safely handle an unexpected situation. Further, to reduce a risk of accident, the path planner 1008 sets a path by increasing a weight to be assigned to a path to avoid the high-risk vehicle.

The processor 902 and the memory 903 in FIG. 9, and the tracker 1002, the image processor 1003, the risk determiner 1004, the data communicator 1005, the local storage device 1006, the controller 1007, and the path planner 1008 in FIG. 10 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1A-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An autonomous driving method of a host vehicle, the autonomous driving method comprising:
   detecting a target vehicle based on at least one sensor of a plurality of sensors of the host vehicle;
   acquiring an appearance characteristic of the target vehicle that is detected based on the at least one sensor, wherein the appearance characteristic is an exterior characteristic of the target vehicle;
   acquiring a driving characteristic of the target vehicle based on at least one sensor of the plurality of sensors;
   determining a risk of collision between the target vehicle and the host vehicle based the driving characteristic of the target vehicle and a comparison result obtained by comparing the appearance characteristic of the target vehicle with a standard image; and
   autonomously controlling the host vehicle based on the risk of collision,
   wherein the determining the risk of collision between the target vehicle and the host vehicle comprises detecting an abnormality in the exterior of the target vehicle using the comparison result.

2. The autonomous driving method of claim 1, wherein the driving characteristic comprises a characteristic associated with a speed of the target vehicle.

3. The autonomous driving method of claim 2, wherein:
   the characteristic associated with the speed of the target vehicle comprises any one or any combination of any two or more of the speed of the target vehicle, a speed of the target vehicle relative to the host vehicle, and a difference between the speed of the target vehicle and an average speed of a vehicle near the target vehicle; and
   the determining of the risk of collision comprises determining the risk of collision based on whether any one or any combination of any two or more of the speed of the target vehicle, the speed of the target vehicle relative to the host vehicle, and the difference between the speed of the target vehicle and the average speed of the vehicle near the target vehicle exceeds a threshold.

4. The autonomous driving method of claim 1, wherein:
   the driving characteristic comprises variances in a speed of the target vehicle; and
   the determining of the risk of collision comprises determining the risk of collision based on whether a number of times that the variances in the speed of the target vehicle exceed a threshold variance during a defined time period exceeds a defined value.

5. The autonomous driving method of claim 1, wherein:
   the driving characteristic comprises a distance between the target vehicle and a vehicle ahead of the target vehicle; and
   the determining of the risk of collision comprises determining the risk of collision based on whether the distance between the target vehicle and the vehicle ahead of the target vehicle is less than a threshold distance.

6. The autonomous driving method of claim 1, wherein:
   the driving characteristic comprises a number of lane changes performed by the target vehicle during a defined time period; and the determining of the risk of collision comprises determining the risk of collision based on whether the number of lane changes exceeds a threshold number of lane changes.

7. The autonomous driving method of claim 1, wherein:
the exterior characteristic comprises an appearance of a part of the target vehicle; and
the determining of the risk of collision comprises:
acquiring the standard image corresponding to the part of the target vehicle based on a type of the target vehicle,
measuring a stability of the part of the target vehicle by comparing the appearance of the part of the target vehicle with the standard image, and
determining the risk of collision based on whether the stability of the part is less than a threshold.

8. The autonomous driving method of claim 1, wherein:
the exterior characteristic comprises an appearance of freight loaded on the target vehicle; and
the determining of the risk of collision comprises:
measuring a fall risk of the freight based on the appearance of the freight loaded on the target vehicle, and
determining the risk of collision based on whether the fall risk of the freight exceeds a threshold.

9. The autonomous driving method of claim 8,
wherein the measuring of the fall risk comprises:
extracting a center of gravity of the target vehicle based on the appearance characteristic of the freight loaded on the target vehicle;
obtaining a standard center of gravity corresponding to the target vehicle based on a type of the target vehicle; and
generating the fall risk of the freight based on a difference between the center of gravity and the standard center of gravity.

10. The autonomous driving method of claim 1, wherein:
the exterior characteristic comprises an overall appearance of the target vehicle; and
the determining of the risk of collision comprises:
acquiring the standard image corresponding to the overall appearance based on a type of the target vehicle,
measuring a deterioration in the overall appearance by comparing the overall appearance with the standard image, and
determining the risk of collision based on whether the deterioration exceeds a threshold deterioration.

11. The autonomous driving method of claim 1, wherein:
the exterior characteristic comprises a type of the target vehicle; and
the determining of the risk of collision between the target vehicle and the host vehicle is further based on an accident rate and a production year of the type.

12. The autonomous driving method of claim 1,
wherein the determining of the risk of collision comprises:
generating a feature vector based on either one or both of the driving characteristic and the appearance characteristic;
inputting the feature vector into a neural network; and
determining the risk of collision based on a vector output from the neural network.

13. The autonomous driving method of claim 1, further comprising:
adjusting a speed of the host vehicle based on the risk of collision; and
changing lanes of the host vehicle based on the risk of collision and a lane of the target vehicle.

14. The autonomous driving method of claim 1, further comprising:
generating an identifier of the target vehicle based on the appearance characteristic of the target vehicle; and
transmitting any one or any combination of any two or more of the identifier, the driving characteristic, the appearance characteristic, and a risk of collision to a vehicle near the host vehicle,
wherein the identifier comprises any one or any combination of any two or more of a license plate, a type, and a color of the target vehicle.

15. The autonomous driving method of claim 1, further comprising:
generating an identifier of the target vehicle based on the appearance characteristic of the target vehicle;
receiving any one or any combination of any two or more of a second identifier, a second driving characteristic, and a second appearance characteristic from a server or a vehicle near the host vehicle; and
updating the risk of collision based on either one or both of the second driving characteristic and the second appearance characteristic, in response to the second identifier being the same as the identifier.

16. A non-transitory computer-readable storage medium storing instructions that, when executed by a processor, cause the processor to perform an autonomous driving method of a host vehicle, the autonomous driving method comprising:
detecting a target vehicle based on at least one sensor of a plurality of sensors of the host vehicle;
acquiring an appearance characteristic of the target vehicle that is detected based on the at least one sensor, wherein the appearance characteristic is an exterior characteristic of the target vehicle;
acquiring a driving characteristic of the target vehicle based on at least one sensor of the plurality of sensors;
determining a risk of collision between the target vehicle and the host vehicle based on the driving characteristic of the target vehicle and a comparison result obtained by comparing the appearance characteristic of the target vehicle with a standard image; and
autonomously controlling the host vehicle based on the risk of collision,
wherein determining the risk of collision between the target vehicle and the host vehicle comprises detecting an abnormality in the exterior of the target vehicle using the comparison result.

17. An autonomous driving apparatus of a host vehicle, comprising:
a processor configured to:
detect a target vehicle based on at least one sensor of a plurality of sensors of the host vehicle;
acquire an appearance characteristic of the target vehicle that is detected based on the at least one sensor, wherein the appearance characteristic is an exterior characteristic of the target vehicle;
acquire a driving characteristic of the target vehicle based on at least one sensor of the plurality of sensors;
determine a risk of collision between the target vehicle and the host vehicle based on and the driving characteristic of the target vehicle and a comparison result obtained by comparing the appearance characteristic of the target vehicle with a standard image; and autonomously control the host vehicle based on the risk of collision, wherein the processor is further configured to determine the risk of collision between the target vehicle and the host vehicle by detecting an abnormality in the exterior of the target vehicle using the comparison result.

18. The autonomous driving apparatus of claim 17, wherein:

the driving characteristic comprises any one or any combination of any two or more of a speed of the target vehicle, a speed of the target vehicle relative to the host vehicle, and a difference between the speed of the target vehicle and an average speed of a vehicle near the target vehicle; and the processor is further configured to determine the risk of collision based on whether any one or any combination of any two or more of the speed of the target vehicle, the speed of the target vehicle relative to the host vehicle, and the difference between the speed of the target vehicle and the average speed of the vehicle near the target vehicle exceeds a threshold.

19. The autonomous driving apparatus of claim 17, wherein:

the exterior characteristic comprises an appearance of a part of the target vehicle; and the processor is further configured to determine the risk of collision by:

acquiring the standard image corresponding to the part based on a type of the target vehicle, measuring a stability of the part by comparing the appearance of the part with the standard image, and determining the risk of collision based on whether the stability of the part is less than a threshold.

20. An autonomous host vehicle, comprising:

a processor configured to:

detect a target vehicle based on at least one sensor of a plurality of sensors of the autonomous host vehicle;

acquire an appearance characteristic of the target vehicle that is detected based on the at least one sensor, wherein the appearance characteristic is an exterior characteristic of the target vehicle;

acquire a driving characteristic of the target vehicle based on at least one sensor of the plurality of sensors;

determine a risk of collision between the target vehicle and the autonomous host vehicle based on the driving characteristic of the target vehicle and a comparison result obtained by comparing the appearance characteristic of the target vehicle with a standard image; and autonomously control a either one or both of a driving path and a speed of the autonomous host vehicle based on the risk of collision, wherein the processor is further configured to determine the risk of collision between the target vehicle and the autonomous host vehicle by detecting an abnormality in the exterior of the target vehicle using the appearance characteristic.

21. The autonomous host vehicle of claim 20, wherein the appearance characteristic comprises any one or any combination of any two or more of an appearance of headlights, an appearance of side-view mirrors, an appearance of windshield wipers, an appearance of tires, an appearance of freight loaded on the target vehicle, and a type of the target vehicle.

22. The autonomous host vehicle of claim 20, wherein the driving characteristic comprises either one or both of variances in a speed of the target vehicle and a number of lane changes performed by the target vehicle during a defined time period.

23. The autonomous host vehicle of claim 20, wherein the autonomous host vehicle is one of an automobile, a motorcycle and a drone.

* * * * *